Feb. 22, 1927.

M. STURM, JR 1,618,237

LEVELING ATTACHMENT FOR CAMERAS

Filed Jan. 19, 1924

Max Sturm Jr.
INVENTOR

BY Victor J. Evans
ATTORNEY

WITNESS:

Patented Feb. 22, 1927.

1,618,237

UNITED STATES PATENT OFFICE.

MAX STURM, JR., OF KEYPORT, NEW JERSEY.

LEVELING ATTACHMENT FOR CAMERAS.

Application filed January 19, 1924. Serial No. 687,325.

The object of this invention is the provision of a camera with a leveling device, whereby pictures may be taken in a proper upright position when the camera is held in either its longitudinal or horizontal positions.

A further object is the production of a leveling device of this character which shall be of an extremely simple construction, cheaply manufactured and marketed, which may be readily attached to any ordinary class of camera, and which will perform its functions with ease and with accuracy.

To the attainment of the foregoing and other objects which will present themselves as the nature of the invention is better understood, reference is to be had to the drawing which accompanies and which forms part of this application.

In the drawing:—

Figure 1:
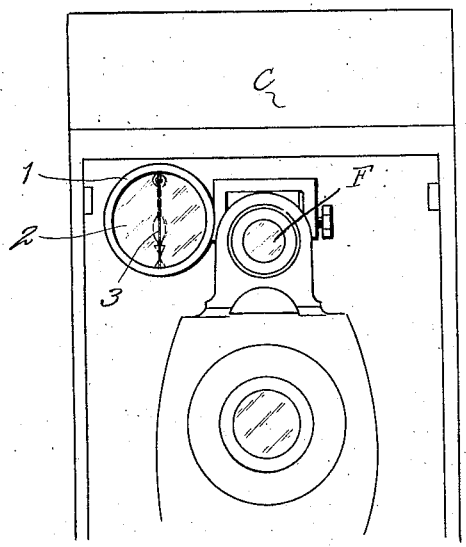
Figure 1 is a front elevation of a sufficient portion of a camera to illustrate the application of the improvement thereon.
Figure 3:
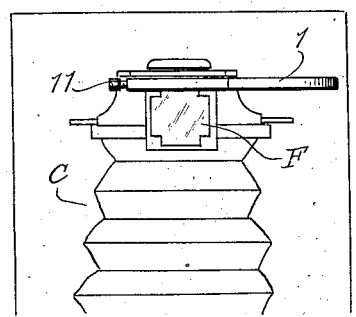
Figure 3 is a fragmentary top plan view of the construction illustrated in Figure 1.
Figure 4:
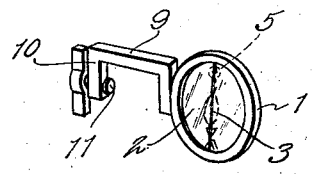
Figure 4 is a perspective view of the improvement per se.

A sufficient portion of a camera to illustrate the application of the improvement thereon is, in the drawing, indicated by the character C. The finder for the camera is indicated by the character F. This finder is of the ordinary character, being mounted for swinging so that the same will assume an upright position when the camera is held in the ordinary vertical position or in a horizontal position.

My improvement contemplates the employment of a casing which includes a ring-like rim 1 and which has its opposite faces closed by transparent disks 2. On each disk there is preferably a central plumb line 3.

In a line with the plumb line 3 at the upper portion of the ring 1 there is a loop member 4 to which is connected an eye 5 on the upper end of an indicating hand 6. The lower and arrow-shaped end 7 of the hand is weighted. Preferably the lower portion of the ring in a line with the marks 3 has a transverse mark or enlargement 8. On one side of the ring there is formed or secured an outstanding substantially U-shaped clamping member 9. The outer arm 10 of the clamp has a threaded opening that receives therethrough a binding screw 11. The screw 11 is designed to contact with one side of the finder F of the camera C.

Figure 2:
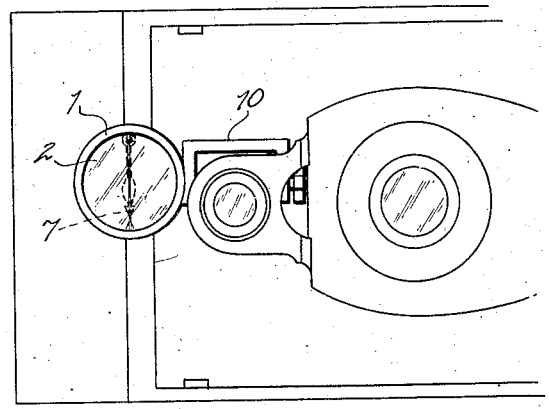
Figure 2 is a similar view, but showing the camera in horizontal position, as when a wide picture is to be taken.
Figure 5:
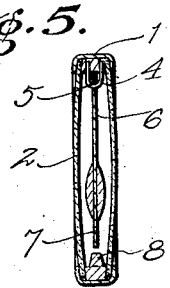
Figure 5 is a sectional view on the line 5—5 of Figure 4.

The camera guide or leveler is preferably arranged upon the right hand side of the finder, so that the user of the camera will have no difficulty in looking through the finder at the object to be photographed and likewise observing the position of the pendent hand or needle with respect to the lines 3 and to the element 8. When the hand or needle is in a line with the lines 3 and the head thereof in a line with the element 8 a perfectly perpendicular picture may be taken. When the camera is swung to horizontal position, as illustrated in Figure 2 of the drawing, the finder will be swung to the same vertical position as the same assumes when the camera is as illustrated in Figure 1, and it is thought that the foregoing description, when taken in connection with the drawing will fully set forth the construction, simplicity and advantages of the improvement to those skilled in the art to which such inventions relate.

Having described the invention, I claim:

A plumbing device for cameras, comprising a ring-like body having a substantially U-shaped bracket extending laterally from one side thereof and an adjustable element associated with the bracket for supporting the body on a camera, said body having transparent plates closing the opposite faces thereof and each of said plates having a central plumb line thereon, of a loop member normally secured between the plumb lines on the transparent facings, a pendulum hand carried by said loop member and an element in the bottom of the ring-like body disposed between the plumb lines on the transparent plates, and normally below the hand of the pendulum.

In testimony whereof I affix my signature.

MAX STURM, Jr.